United States Patent

[11] 3,623,083

| [72] | Inventors | Werner Fessler<br>Heidelberg;<br>Heinz Leiber, Leimen, both of Germany |
|---|---|---|
| [21] | Appl. No. | 882,595 |
| [22] | Filed | Dec. 5, 1969 |
| [45] | Patented | Nov. 23, 1971 |
| [73] | Assignee | Teldix G.m.b.H.<br>Heidelberg, Germany |
| [32] | Priority | Dec. 6, 1968 |
| [33] | | Germany |
| [31] | | P 18 13 121.0 |

[54] ELECTROMECHANICAL INDICATING DEVICE
6 Claims, 5 Drawing Figs.
[52] U.S. Cl...................................................... 340/366,
340/378
[51] Int. Cl...................................................... G08b 5/24
[50] Field of Search........................................... 340/366,
378, 381

[56] References Cited
UNITED STATES PATENTS
3,482,126  12/1969  Bradley........................ 340/378 X
3,508,256  4/1970  Dudley et al................... 340/366 X

*Primary Examiner*—Richard Murray
*Attorney*—Spencer & Kaye

ABSTRACT: An electromechanical indicating device for selectively displaying a plurality of symbols having a permanent magnet rotor, to which a symbol carrying cover is coupled, which is selectively deflectable to a plurality of discrete angularly spaced positions by selective energization of the excitation coils or windings placed on the pole pieces of the stator which is formed from a single piece of magnetizable material. The axes of the pole pieces of the stator and windings thereon are parallel to the vertical of rotation of the rotor. The symbols are on the vertical outer surface of the cover which has a height substantially greater than the outer periphery thereof divided by the number of symbols thereon. Deflection of the rotor is preferably brought about by selective energization of two or three adjacent windings.

3,623,083

INVENTORS
Werner Fessler &
Heinz Leiber

BY Spencer & Kaye
ATTORNEYS

ELECTROMECHANICAL INDICATING DEVICE

BACKGROUND OF THE INVENTION

The present invention relates to an electromechanical indicating device consisting of a stator having a plurality of magnetizable poles and excitation windings disposed thereon and a rotor in the form of a permanent magnet rotatably mounted between the poles and connected to a carrier provided with the symbols to be indicated.

Such indicator devices have been used in aircraft, computers or other electronic systems as miniature modules to indicate numbers, symbols or the like. Typically as shown in U.S. Pat. Nos. 3,350,709 and 3,311,911, such indicators consist of a stator having five poles which is cast in synthetic resin and a rotatably mounted round, but transversely magnetized, permanent magnet which is connected to a cup-shaped cover extending over both components which bears the symbols to be indicated. To change the position of the rotatably mounted permanent magnet, electrical coils are provided which are placed on radially extending poles of the stator. The poles are connected together at their outer ends by means of a yoke ring. Applying a direct voltage to one of the five coils, causes the permanent magnet to rotate to a position so that a certain symbol associated with this coil appears in the window of the covering housing. It is thus possible to provide an indication of five different symbols with the five coils in this indicator device. The common actuation of two adjacent coils produces five further indications. Thus the numbers from 0 to 9 can be reproduced with these known indicator devices.

The prior art indicating devices of this type, however, suffer from a number of problems which if overcome, would not only result in the devices being easier to manufacture, but moreover, result in improved performance thereof. For example, the construction of the stator poles in the prior art devices requires the use of very small excitation coils, for example a few millimeters in length, which are difficult to handle and to place on the radially extending pole piece of the stator. Additionally, due to the radial nature of the poles of the stator in the indicating devices according to the prior art, the symbol bearing cover for the device, which is connected for rotation with the rotor, must have a relatively large diameter. Since the diameter of the movable system of the indicator, and hence the inertial moment thereof is related to the power required to move the rotor to a selected position within a given time, any reduction of this inertial moment will improve the operating characteristics.

Additionally, due to the structure of the symbol-bearing cover of the prior art devices, the available area for the height of the smybol symbol generally restricted, resulting in very compressed thick numbers which are relatively difficult to read.

SUMMARY OF THE INVENTION

It is therefore the object of this invention to overcome many of the problems in the prior art devices by reducing the structural volume of the known indicator devices without thus inhibiting the recognizability of the symbols to be indicated, while simultaneously permitting faster operation of the device without the requirement for increased power.

The above-stated objects are achieved according to the invention by providing the stator, of an electromechanical indicating device having a permanent magnet rotor mounted for rotation about an axis transverse to the direction of magnetization thereof and a symbol carrier which is coupled to the rotor for rotation therewith, with pole pieces which have their axes parallel to the axis of rotation of the rotor and are magnetically coupled together at one end. The excitation coils may then be placed on these pole pieces so that the axis of the coils are also parallel to the axis of rotation of the rotor.

According to another feature of the invention, the rotor is of cylindrical shape, and is provided with longitudinal grooves on its surface in order to prevent the rotor from inadvertantly changing its position because of shocks or vibrations and to aid in the positioning of the rotor.

According to another feature of the invention, rather than the energization of one coil or a pair of adjacent coils in order to move the rotor to a selected position as in the prior art device, according to the invention, two or three adjacent coils are simultaneously energized in order to position the rotor. The simultaneous energization of the coils on three adjacent stator poles causes the rotor to position itself opposite the middle energized stator pole, while energization of the coils on a pair of adjacent stator poles causes the rotor to position itself between the pair of stator poles. This arrangement produces the advantage that more than one stator pole is always contributing to the production of the torque, thereby further enhancing miniaturization and the reduction of the time required to position the rotor.

The construction of the stator according to the invention, results in the device having a reduced diameter and an increased height or axial width when compared with the corresponding dimensions of the indicating devices according to the prior art. Since this change in dimensions also applies to the symbol-bearing cover connected with the rotor, the relative reduction of the diameter of the cover according to the novel construction of the invention, results in the relative reduction of the inertial moment of the movable portions of the indicating device. Accordingly, with the same power input per pole as in the prior art indicating device, the novel construction according to the invention results in a shorter time for positioning the rotor, or, if the same positioning time is desirable, a lower power consumption than is possible with the prior art device. The construction according to the invention also provides a further significant advantage in the manufacture thereof since it is much simpler to place the coils which are only a few millimeters in size onto the relatively long axial pole pieces of the stator, and thus parallel to one another, than to place them onto the radial pole pieces as was the previous practice. Additionally, the small coils may be relatively longer and can thus be wound more easily, i.e., in their uncast state they have higher stability and can thus be handled easier.

The dimensional changes according to the present invention permit a new division of the outer surface of the symbol-bearing cover. In the prior art indicators, the numbers preferably employed as symbols were so applied to the rotatable cover that their extent in height coincided with the circumferential direction, resulting in very compressed, thick numbers. When, however, the height of the cover is substantially greater than the circumferential divided by the total number of the symbols, which occurs almost by itself with the basic concept of the present invention, then the areas of the surface of the cover available for each symbol are about twice as long as they are wide and the numbers can be formed to be slender and easy to read. Of course, in contradistinction to the known indicating devices, the cover must now be in front of the observer with its axis upright or vertical.

DESCRIPTION OF THE PREFERRED EMBODIMENT

Figure 1:
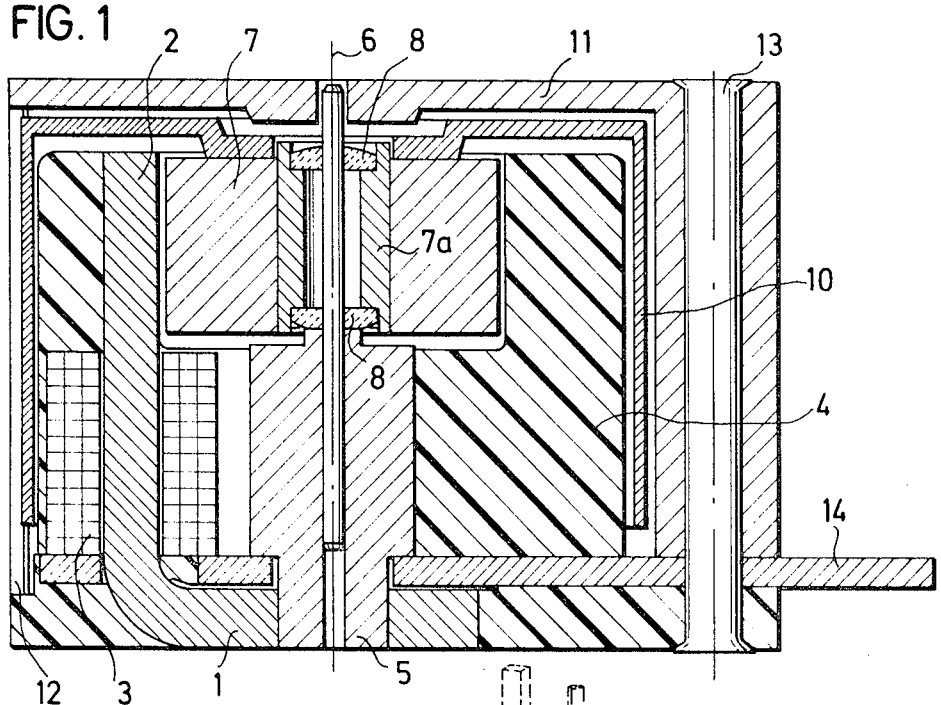
FIG. 1 is a sectional view of an electromechanical indicating device according to the invention.
Figure 2:
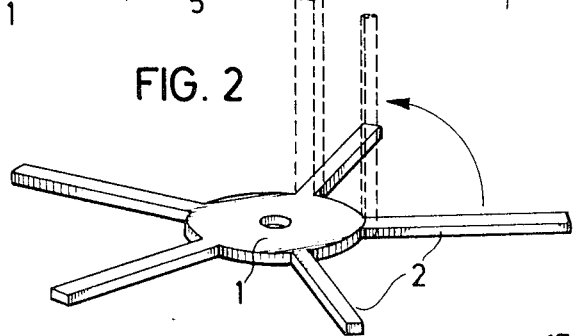
FIG. 2 is an isometric view of a stator element for the electromechanical indicating device according to the invention, illustrating the manner in which the stator is formed.

Referring now to FIG. 1, there is shown an electromechanical indicating device having a stator with a bottom portion 1 and a plurality of vertical pole pieces 2 (only one of which is illustrated in the figure,) which are connected together at their lower ends by means of the yoke portion 1. Preferably the stator is formed by cutting a single piece of magnetizable material into the shape shown in FIG. 2. Although five pole pieces 2 are illustrated, it is understood that this is by way of example only and that more or less pole pieces may be utilized depending on the number of symbols to be indicated. Final construction of the stator is achieved by bending the pole pieces at an angle of approximately 90° to the position shown by the dashed lines in FIG. 2. Axially mounted on each of the pole pieces 2 is a separate excitation coil or winding 3 having their leads connected to a printed circuit board 14. As illustrated, the stator including bottom portion 1 and pole pieces 2, together with the plurality of coils 3 thereon and a portion of the circuit board 14 are embedded in a circular block of cast resin material 4. Supported within the central recesses of the block of case resin 4 by means of a brass bolt 5 is a stationary axle 6 which is parallel to the axes of the pole pieces 2 and the excitation coils 3. The axle 6 supports and forms the axis of rotation of a permanent magnet rotor 7 which is magnetized in a direction transverse to the axle 6.

In order to obtain movement of the rotor 7 with as little friction as possible, the rotor 7 is supported on the axle 6 by means of a pair of jeweled bearings 8 mounted in a bearing box 7a which forms a yoke for the rotor. The play of the bearings 8 is approximately of the order of 0.02 mm. This relatively large play insures that the rotor 7 will safely and quickly follow a change in position of even 180°.

Figure 4:
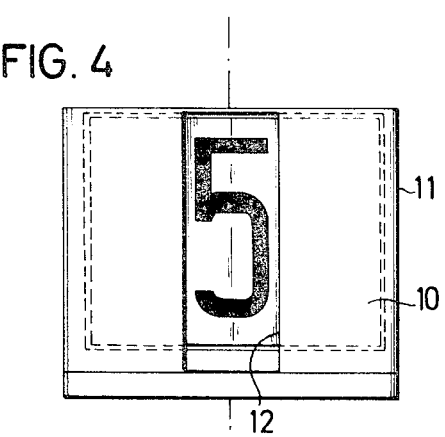
FIG. 4 is a front view of a complete electromechanical indicating unit according to the invention.

Connected to the rotor 7, and extending over the outer circumference of the block of encapsulating material 4, and hence essentially surrounding the entire magnetic system including the pole pieces 2, is a symbol carrier or cover 10. Formed on the outer surface of the cover 10, which preferably as illustrated is of cylindrical shape, are the symbols to be indicated. The symbols may be formed thereon by any convenient method, for example by painting or the like. In order to complete the device, an upper housing portion 11 having a window 12 for displaying the selected symbol is fastened to the cast resin element 4, for example, by means of a rivet 13. A front view of the indicating device illustrating the window 12 and the symbol therein more clearly is shown in FIG. 4. By insuring that the height of the cover 15 is substantially greater than the circumference thereof divided by the number of symbols, as can easily be seen from in FIG. 4, the symbols indicated are of relatively large height compared to their width, and consequently easy to read.

In order to position the rotor, the control circuitry for selectively actuating the excitation coils 3 is connected to the protruding portion of the circuit board 14 either by soldering or by means of plug-type connectors. Although the indicating device according to the invention can be utilized with the conventional type circuitry generally associated with this type of indicating device whereby one or two coils are energized to selectively position the rotor, preferably circuitry is used which simultaneously energizes two or three adjacent coils. By selectively actuating three adjacent excitation coils 3, the rotor 7 may be positioned in five different discrete angularly spaced positions, i.e., with the magnetic field pole thereof facing one of the five stator pole pieces. Thus, five different symbols which are spaced about the surface of the cover 10 will selectively become visible in the window 12 of the upper housing portion 11. Additionally, selective actuation of two adjacent excitation coils 3 will cause the rotor 7 to rotate to five different angularly displaced positions which are located intermediate the pole pieces 2; thus enabling the indicating of five additional symbols on the cover 10.

The circuitry which allows the simultaneous actuating of either two or three adjacent coils is similar to that circuitry represented in FIG. 4 of the U.S. Pat. No. 3,350,709, the operation of which is described in column 4 of this patent in connection with FIG. 5, table B. There, however, either one or two coils are energized. In the above mentioned case it is, in contradistinction, necessary to energize three adjacent coils simultaneously instead of one coil by operating the corresponding switches.

Figure 3:
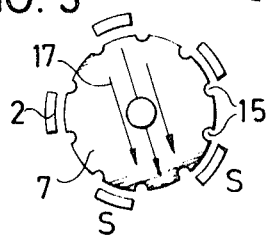
FIG. 3 is a schematic plan view illustrating the relationship between the stator pole pieces and one embodiment of the rotor according to the invention.

In order that the rotor 7 be more quickly and more accurately positioned and maintained at the positions intermediate the pole piece 2, the cylindrical rotor 7 is preferably provided with a plurality of longitudinal slits or grooves along the periphery thereof so that the number of pole-type protrusions on the circumference of the rotor is twice that of the number of pole pieces 2. These slits or grooves 15 are illustrated in FIG. 3 wherein the arrow 17 indicates the direction of the magnetic field in the rotor 7. The energization of two of the coils 3 in such a manner that the pole pieces 2 marked with an S represent South Poles, will cause the rotor 7 to assume the illustrated position.

Figure 5:
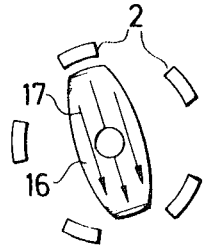
FIG. 5 is a schematic view illustrating the relationship between the stator pole pieces and a second embodiment of a rotor according to the invention.

FIG. 5 illustrates an alternate embodiment of the indicator device according to the invention having a two-pole rotor 16 of elongated tub-type shape. The rotor 16 is also magnetized transverse to its axis of rotation but has the advantage that due to its shape asymmetries or in inhomogeneities of the permanent magnet material do not become as effective as the cylindrical design of the rotor according to FIG. 3.

Throughout the application it is stated that the pole pieces 2 and the bottom portion 1 of the stator are of "magnetizable material." This term is understood to mean, that the pole pieces 2 and the bottom portion 1 of the stator are either of soft iron or of a feromagnetic material, which has a small remanence and not of a material similar to the material of the rotor 7, which is characterized by a high remanence.

It will be understood that the above description of the present invention is susceptible to various modifications, changes and adaptations, and that same are intended to be comprehended within the meaning and range of equivalents of the appended claims.

We claim:

1. In an electromechanical rotary indicating device for selectively displaying a plurality of symbols in response to electrical energization, said indicating device being of the type including a stator having a plurality of magnetizable pole pieces and a magnetizable yoke portion connecting the pole pieces together at one end thereof, a separate excitation coils axially mounted on each of said pole pieces, a permanent magnet rotor rotatably mounted between said pole pieces for rotation about an axis transverse to the direction of magnetization of said rotor, circuit means for selectively energizing said coils to position said rotor to a selected one of a plurality of discrete angularly spaced positions, and a cylindrical cover having the symbols to be indicated thereon and coupled to said rotor for rotation therewith, the improvement wherein; said stator pole pieces are disposed with their axes parallel to the axis of rotation of said rotor; said stator is formed from a single piece of magnetizable material with said pole pieces being substantially perpendicular to said yoke portion; the axis of rotation of said rotor is in a vertical plane; and said cover substantially surrounds said pole pieces and has said symbols on the vertical outer surface thereof, said cover having a height which is substantially greater than the outer periphery thereof divided by the number of symbols thereon.

2. The electromechanical indicating device defined in claim 1 wherein said stator comprises a single piece of flat magnetizable material which has been cut to the desired shape, and said pole pieces being bent so that they are substantially perpendicular to said yoke portion. they 3. The electromechanical indicating device of claim 1 wherein said rotor is a two pole tube-shaped rotor.

4. The electromechanical indicating device defined in claim 1 wherein the number of said pole pieces is equal to one half of the number of symbols to be indicated.

5. The indicating device defined in claim 4 wherein said rotor is cylindrical and has a plurality of equally spaced grooves formed in the periphery thereof, whereby said rotor is divided into a number of pole-type protrusions which is a multiple of the number of said pole pieces.

6. The indicating device defined in claim 4 wherein said circuit means simultaneously energizes either two or three adjacent excitation coils depending on the particular symbol desired to be indicated to thereby respectively position said rotor either between the corresponding two adjacent pole pieces or opposite the center one of the corresponding three adjacent pole pieces.

* * * * *